Dec. 8, 1959    H. Z. GORA    2,915,784
MOLDING APPARATUS
Original Filed April 17, 1952    4 Sheets-Sheet 2

INVENTOR
*Henry Z. Gora*

BY
*Johnson and Kline*
ATTORNEYS

Dec. 8, 1959  H. Z. GORA  2,915,784
MOLDING APPARATUS

Original Filed April 17, 1952  4 Sheets-Sheet 3

INVENTOR
*Henry Z. Gora*

BY *Johnson and Kline*
ATTORNEYS

Dec. 8, 1959 H. Z. GORA 2,915,784
MOLDING APPARATUS
Original Filed April 17, 1952 4 Sheets-Sheet 4
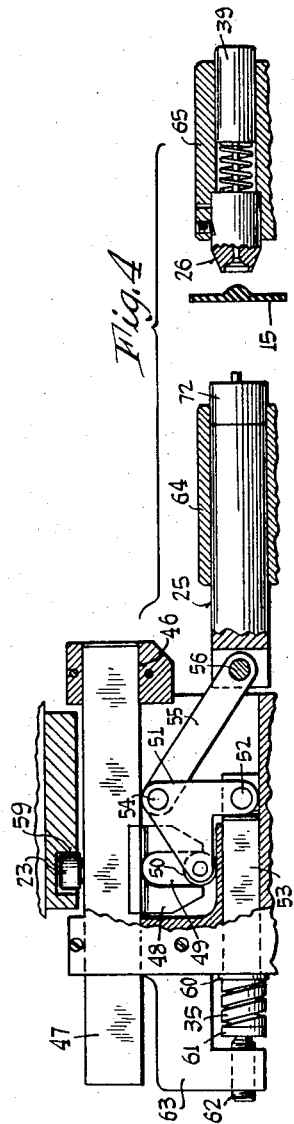
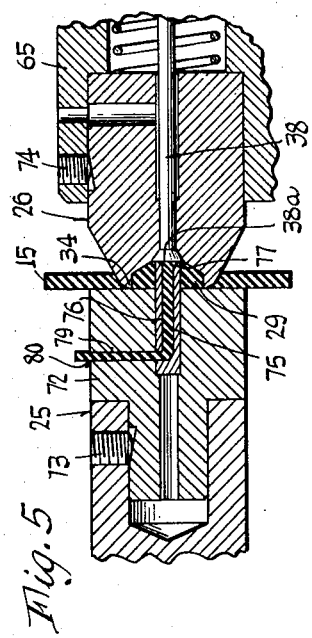
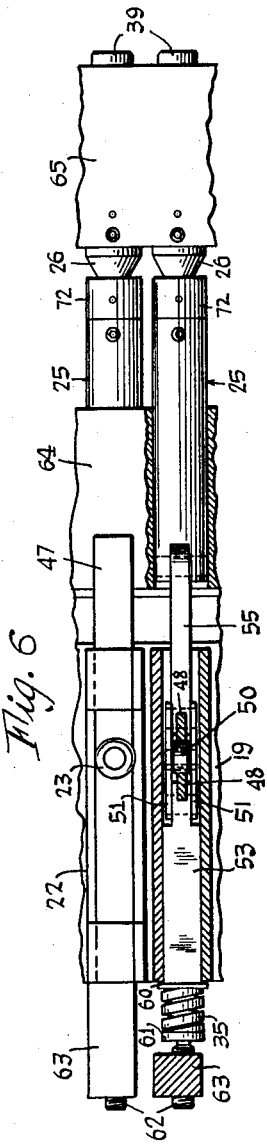
INVENTOR
Henry Z. Gora
BY Johnson and Kline
ATTORNEYS

United States Patent Office 2,915,784
Patented Dec. 8, 1959

2,915,784

MOLDING APPARATUS

Henry Z. Gora, Stratford, Conn., assignor, by mesne assignments, to The Eagle-Picher Company, Cincinnati, Ohio, a corporation of Ohio Original application April 17, 1952, Serial No. 282,795, now Patent No. 2,864,123, dated December 16, 1958. Divided and this application July 17, 1956, Serial No. 598,479

14 Claims. (Cl. 18—20)

This invention relates to an apparatus for molding articles of plastic material and constitutes a division of my co-pending application Serial No. 282,795, filed April 17, 1952, now Patent 2,864,123 of December 16, 1958.

In my prior Patent No. 2,548,306, dated April 10, 1951, there is disclosed the method of molding articles including the steps of plasticizing material, producing an endless strip thereof, and passing the latter between pairs of co-operating die members which blank material from the strip and mold it to shape. When, as illustrated in said patent, the dies are on the periphery of adjacent drums, the time during which the cavity of each die is closed is extremely short (when the apparatus is operated at practical speeds) with the result that the material is not subjected to the heat of the dies long enough to permanently set it in shape, and slight distortions of the article occur while they are being cured out of the die cavity, in a curing oven for instance. For many kinds of articles, such as nail washers, garter buttons, etc., such distortions do not interfere with the proper functioning or use of the article.

To permit more precise molding of articles, I have devised methods and apparatus in which the material is kept in the heated die cavity for a relatively longer period of time. This is accomplished by providing a series of pairs of axially aligned die members traveling in a closed path (being mounted on a carrier such as a wheel or drum for instance), guiding a strip of plasticized material longitudinally into a space between the open die members, and then closing the die members on the strip to blank out and mold a portion of the strip in the heated die cavities which are closed during more or less of the travel of the die members in their cycle of movement to set the material to desired shape and size.

One species of my invention is disclosed in my Patents Nos. 2,593,438 and 2,593,668, granted April 22, 1952, in which the die members are closed on the strip of molding material and remain closed carrying the impaled strip along with them until the die members are separated and the articles discharged therefrom. For certain articles and under certain conditions this method is efficient and high production can be obtained with relatively inexpensive apparatus.

In another species of my invention, that disclosed and claimed herein, by making a larger carrier or wheel and increasing the number of pairs of die members and thus prolonging the time during which the material in the die cavity is subjected to heat and pressure, without proportionately reducing the production rate, I am able to produce in satisfactory quantities molded articles more precise and uniform than has heretofore been possible with multi-cavity platen molding, albeit the apparatus costs more to produce than that shown in my above mentioned patents, but a greater variety of precision molded articles may be produced by its use.

In the hereindisclosed apparatus, the strip of plasticized material follows the path of the die members for only long enough to bring the die members together on the strip and blank out therefrom a quantity of the material and deposit it in the die cavity. Within a short time the die members are separated and the strip is guided out of the path of the die members leaving the blank in one of the cavities. This has the practical advantage of avoiding the partial curing of the skeletonized strip which would occur in prolonged contact with the heated die members and thus the strip may remain reusable. After the strip is removed, the die members are closed under resilient yielding pressure and the blank or slug in the cavity responds to the heat of the die members and flows to fill the cavity and in its prolonged confinement in the cavity becomes semi-cured to a degree where, upon discharge from the cavity and further curing in an oven, the article will maintain its desired shape and size.

The duration of this semi-curing operation depends on the kind and the formulation of the material used, the volume of the piece molded and its thickest cross-section, and the temperatures to which it may be exposed without scorching. The size of the apparatus, i.e. the length of the path of the die members and their speeds of travel, may be calculated to obtain satisfactory semi-cure at the desired economically efficient rate of production.

The thickness of the plastic strip (controlled by the warming mill rollers in the embodiment of the invention herein illustrated) is predetermined to produce a blank or slug having a mass before responding to the prolonged heating effect of the die members slightly in excess of that needed to fill the cavity and form the desired article. With many kinds of articles the contacting surfaces of the cavity forming parts of the die members are capable of removing from a strip of practical or optimum thickness a blank of the desired mass.

I have found it advantageous to relieve the pressure of the die members on the blank one or more times after the blank is initially formed by the dies to permit the escape of any gas or air which may be trapped in the cavities and to permit excess material to easily flow past the cut-off surfaces. Such excess material remains attached to the strip and is removed therewith.

I have also devised an efficient mechanism for opening, closing and holding the die members closed whereby each pair of die members is individually controlled both as to their positive action and their resiliently yielding action.

The die members are preferably carried by a heated portion of the carrier or drum while the operating mechanism therefor is carried by a portion of the carrier which is not intentionally heated and preferably should be as cool as possible to maintain the parts properly lubricated. I have devised a unique way of securing these two carrier or drum parts together in poor heat conducting relation.

These and other features and advantages of the present invention will be described below.

In the accompanying drawings:

Fig. 1A is a diagrammatic view showing the outline of the cams for performing the various operations.

Fig. 4 shows the die members and the operating unit in position with the movable die member retracted.

Fig. 5 is an enlarged view of the operating ends of the die members showing one way of producing a hole clean through the molded article.

Fig. 6 is a plan view on a larger scale than Fig. 2, of two adjacent operating units showing one in section.

Figure 1:
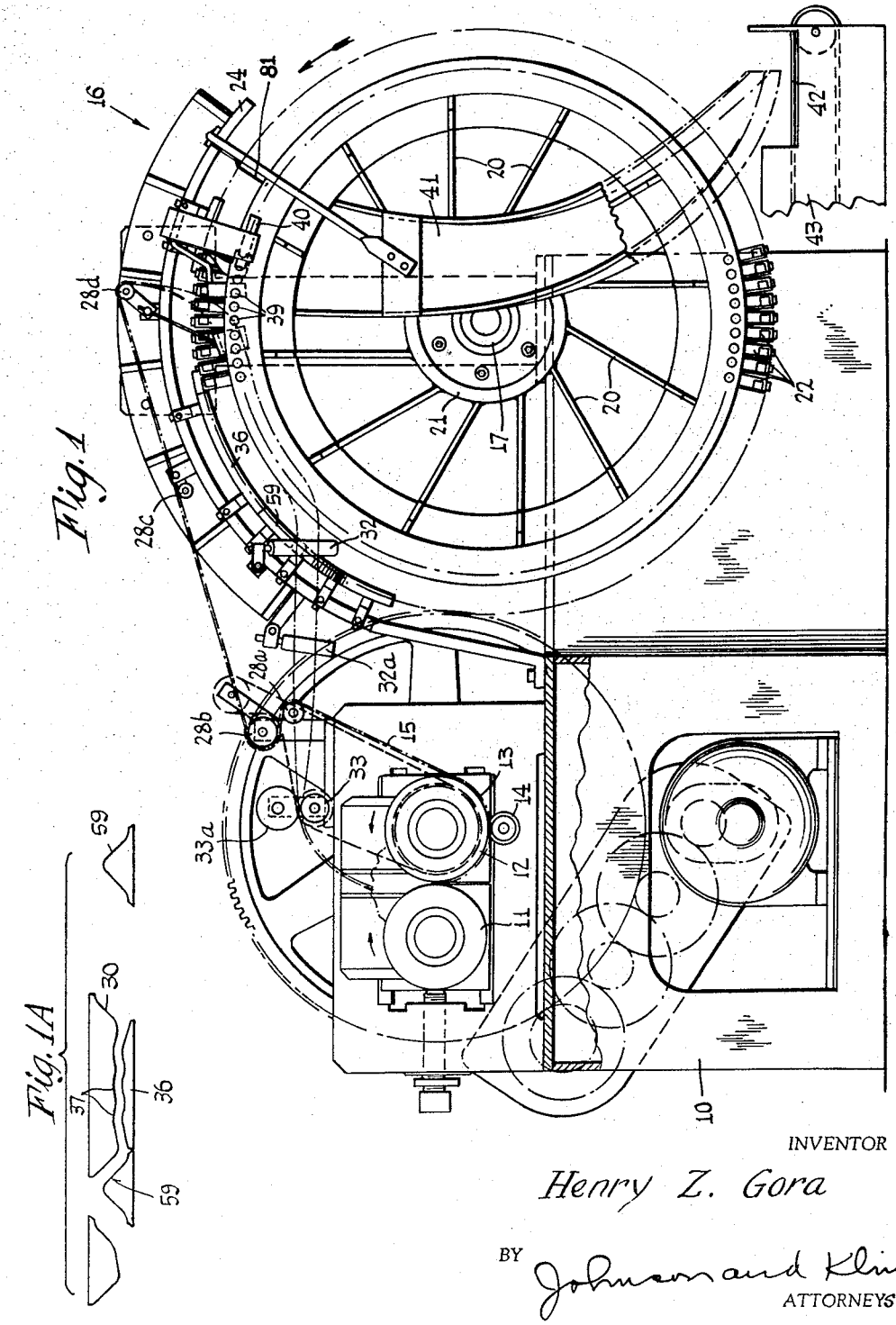
Figure 1 is a side elevation, partly in section, of the apparatus of the present invention.
Figure 2:
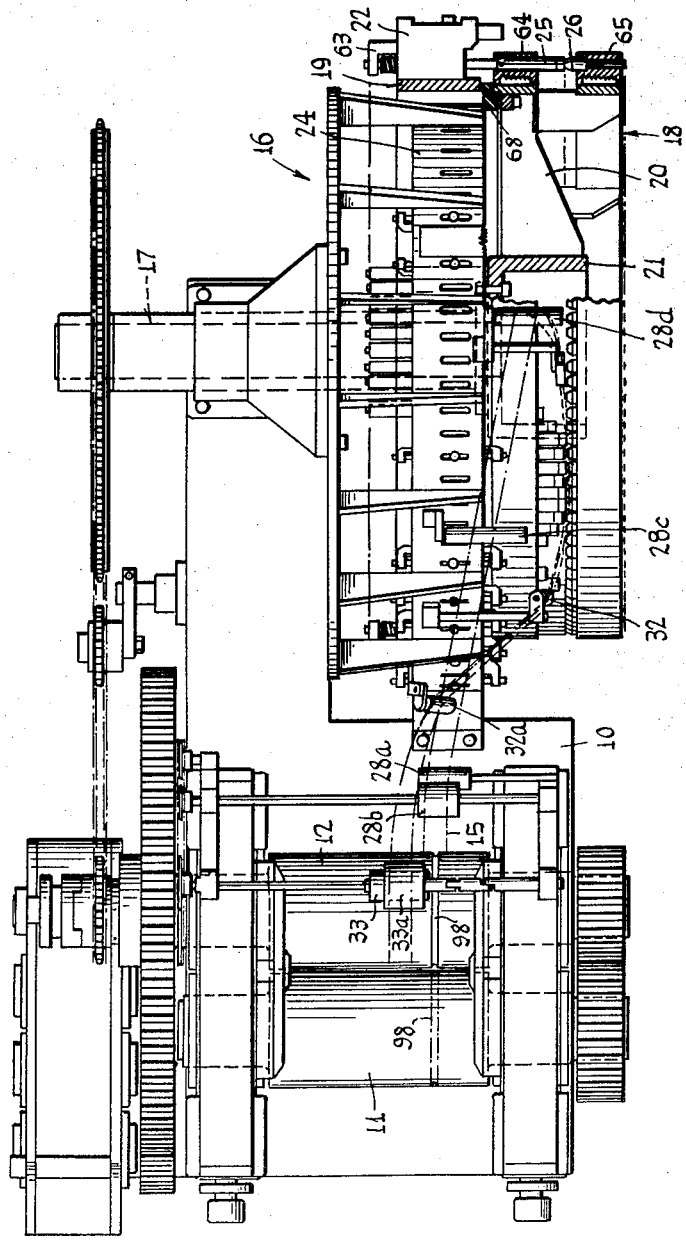
Fig. 2 is a plan view of the apparatus, also partly in section.

As shown in the accompanying drawings, the apparatus of the present invention comprises a frame 10 at one end of which is mounted a pair of mill rollers 11 and 12 on which a quantity of moldable material such as rubber or similar material may be plasticized and form on the roller 12 an enveloping layer 13 of determinate thickness controlled by the spacing between the mill rollers. Cutters 14 remove from the layer 13 a strip 15 of determinate width, the void resulting in the layer 13 being constantly filled by migration of the material in the bank so that the strip 15 is continuous so long as the bank is maintained and the machine is operated.

At the other end of the frame there is a carrier or drum-like structure 16 mounted on a horizontal shaft 17 and rotatingly travels in a vertical plane. The carrier or drum 16 is formed of two parts 18 and 19, the part 18 having spokes 20 extending from a hub 21 and the part 19 being in the form of a ring carried by the part 18. The part 19 has removably mounted on its periphery a series of operating units 22 closely spaced and each including a cam follower 23. Secured to the frame and overlying the drum part 19 for a large arc of the latter's movement is a cam support 24 on which a plurality of cams are adjustably mounted in position to be engaged by the followers 23 as the drum rotates. Mounted on the part 20 of the drum is a series of pairs of coaxially aligned die members 25 and 26 which may be separated and brought together.

As shown, the die members 25 are mounted to move axially toward the die members 26 and each is connected to an axially aligned operating unit 22 by which it is operated when the cam follower 23 reaches and is operated by the cams on the cam support 24 during the rotation of the carrier or drum. The die member 26, in the embodiment of the invention herein illustrated as exemplary thereof, is mounted so as not to be movable for molding purposes.

In the open position there is a space between the die members 25 and 26 and it is into this space that the strip 15 is guided from the mill roller by guides 28a, 28b, 28c and 28d set at such angles that the horizontally disposed strip is twisted to lie in a vertical plane and to enter the space 27 between the die members substantially tangentially to the path of the die members. When so located, movement of the die member 25 to closed position engages the strip 15 and presses it against the die member 26 with sufficient force to sever a blank 29 from the strip and deposit it in the die members. At the same time the strip 15, which is somewhat wider than the working ends of the die members 25 and 26, is impaled on the die member which penetrates it and is carried around with the drum by the die member. When the material being molded is to be semi-cured, the die members 25 and 26 are heated by conduction or otherwise through their supporting means in a manner hereinafter explained.

According to the present invention the strip 15 is carried along with the die members only so long as is necessary to control the strip and partially form the blank. Hence the die-closing cam 30 is of such length and so positioned that after a few succeeding die members have impaled the strip 15, the movable die member 25 recedes and opens the space between the die members and the strip 15 is stripped from the die member 25 by a stripper after which the strip is guided from the path of the die members by guide rollers 32, 32a and is traveled back to the bank on the mill rollers to there commingle with the bank, the strip being assisted in its return movement by power driven feed roller 33 and pressure roller 33a engaging it.

By thus quickly removing the skeletonized strip 15 from the die members the danger of partially curing the material of the strip by prolonged contact with the heated die members is avoided and the strip is returned to the mill at substantially the same temperature as that at which it left.

The short period during which the die members are closed to form the blank is not always sufficient to set, or in the parlance of the art "kill the nerve" of the material, and precision molded articles are not thus produced although for making such articles as nail washers, garter buttons, etc. it is sufficient and the articles can be immediately discharged from the molding cavity.

However, according to the present invention in order to perform precision molding, as soon as the strip 15 is removed, leaving the blank in the cavity of one of the die members, the die member 26 in the form shown, the movable die member is again moved to cavity closing position by another lobe on the cam 30 so that the blank may be subjected to heat while confined in the molding cavity between the die members 25 and 26 for a prolonged period sufficient to cause the material to flow and fill the cavity (and overflow if necessary during its heating up) and become semi-cured to the degree in which it will maintain its shape and size after being discharged from the die cavity and may be, as taught in my prior Patent No. 2,548,306, completely cured or vulcanized in an oven.

According to the present invention in its preferred form the article is not discharged from the die members 25 and 26 until the die members are opened to receive the strip 15, since, considering the speed of the drum, if the semi-curing step should require less time than is required to bring the article curing dies to open strip-receiving position the speed of rotation of the drum may be increased, thus increasing the rate of production.

As is the practice in conventional molding processes the timing of the operations should take into consideration the usual factor including the kind of material used, its formulation, the volume of the article, the maximum cross-sectional thickness thereof, the hardness desired and the safe temperatures at which the material may be processed.

After the die members are closed on the blank the latter expends and tends to overflow the cavity, escaping past the cut-off surfaces 34 at the parting line of the die members. This is permitted, according to the present invention, when the pressure within the cavity reaches a determinate value by the yielding of a spring 35 in each operating unit which, as hereinafter explained, permits the movable die member to back off slightly from the fixed die member. When the pressure is released due to the escape of the material, the spring 35 returns the movable die member 25 to the fixed die member 26 and the overflow of the material in the cavity is cut-off.

To facilitate the escape of excess material when the blank is initially formed, the cam 36 is positioned and shaped to retract and advance slightly the movable die member 25 one or more times as the heating of the blank progresses, the cam 36 having undulations 37 for this purpose. The repeated opening and closing of the molding dies by the cam 36 also affords an opportunity for air or other gases which might be trapped in the cavity to escape and the excess or overflow material is allowed to remain attached to the strip 15 which during these repeated retractions is still carried along with the die members.

After the cavity is opened by retraction of the movable die member 25 just before the next blank is formed the molded article is ejected from the fixed die member 26 carrying it. At the time the die member 25 is retracted any flash material between the contacting or cut-off surfaces of the dies is free to fall away as the molded article is ejected. Any flash material clinging to the molded article is readily separated therefrom in a tumbling operation since it is extremely thin and only loosely attached. For the purpose of so ejecting the article the fixed die member 26 is provided with an axially disposed ejector plunger 38 having an extension 39 to be engaged by a cam 40 carried by the frame of the machine. As the drum 16 revolves the extension 39 on the ejector 38 engages the cam 40 and the article within the fixed die is pushed from the cavity. The ejected article falls through the space between the die members 25 and 23 and between the spokes 18 of the drum onto a chute 41 which guides it to the end of a conveyor belt 42 within a tunnel 43. The tunnel 43 is heated to vulcanizing temperature and the belt is traveled at such a speed that by the time a molded and semi-cured piece reaches the end of the tunnel it will be vulcanized.

Figure 3:
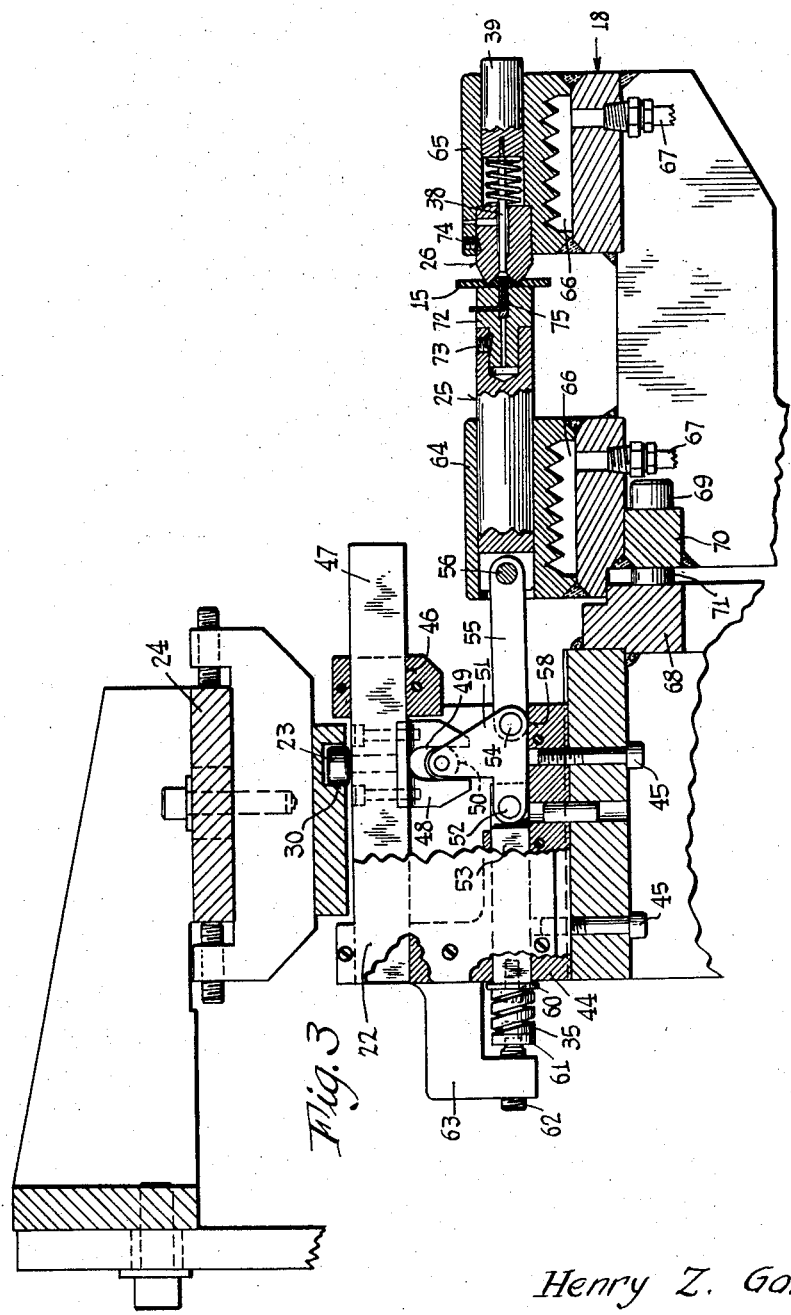
Fig. 3 is a fragmentary sectional view taken through the drum and showing the cooperating die members and the associated operating unit in die-closing position.

The operating unit 22 comprises a separate subframe or housing 44, the base of which is removably secured in a keyway 19a by bolts 45 to the part 19 of the drum in substantial alignment with the axis of the die members 25, 26. As shown in Fig. 3 a dowel pin 45 locates the housing 44 in the keyway 19a in proper position to receive the fastening screw 45.

The upper portion of the housing 44 has a guideway 46 to receive a slide bar 47 carrying a cam follower roller 23 for engagement with the cam 30 carried by the cam support 24 mounted on the frame. The lower part of the slide bar 47 carries a block 48 having a vertical slot 49 in which rides a roller 50 on a bell crank 51. The bell crank 51 has a pin 52 carried by a bar 53 constituting the relatively fixed pivot point of the bell crank. The bell crank 51 has a pivotal connection 54 with a link 55 pivotally connected at 56 to the die member 25 which reciprocates in a ring 64 forming part of the drum part 18. When the slide bar 47 is in the position shown in Fig. 4 the die member 25 is retracted and when it is moved by one of the cams to the right as shown in Fig. 3, the die member 25 is advanced and the pivotal connections 52, 54 and 56 between bar 53, the bell crank 51 and the link 55 are brought into alignment so that any force tending to push the die member 25 to open position will necessarily have to move the pivot point 52 for the bell crank, since the latter and the link constitute a toggle which is locked in the extended or cavity closing position of the die member. Preferably, the bell crank 51 shows its pivotal connection 54 with the link 55 slightly beyond a straight line drawn between the pivot point 52 and the pivot point 56 on the die member 25 where it comes to rest against an abutment surface 58. In this position the toggle is self-locked and will remain so without the follower roller 23 engaging the cam 30, and thus the load of keeping the toggle locked does not have to be sustained by the stationary cam with the resulting continuing work and friction, but is sustained entirely by the drum 16 which, of course, rotates with the operating unit. To unlock the toggle, the follower roller 23 is engaged by cam surfaces 59 on the other side of it to move it to the left as shown in Fig. 4.

To maintain the die cavity closed under yielding resilient force, the rod 53 on which the pivot point 52 for the bell crank 51 is mounted is slidably mounted in the housing 44 of the unit. The end of the rod has a head 60 extending beyond the housing and normally engaging it to limit the inward movement of the rod. Engaging the head is the coil spring 35, the other end of which engages a head 61 mounted on a screw 62 threaded in an extension 63 of the housing 44. When the die is closed, any force acting to open it, for instance the expansion of the material contained within the die cavity, is transmitted through the link 55, bell crank 51 and pivot point 52 to the rod 53, which may be moved under the yielding resiliency of the spring 35. When the force is released the spring 35, acting through the parts just named, will return the die member 25 to cavity closing position. The same action takes place when the die member 25 is initially closing on and penetrating the strip 15 of molding material, for if the resistance to penetration is too great considering the speed of movement, the spring 35 will initially yield and then return to its normal position when the material has had sufficient time to squeeze out from between the movable and immovable die members. The spring 35 also permits the slight recession of the pivot point 52 of the bell crank when the connecting pivot 54 between the bell crank 51 and the link 55 passes over dead center.

It will be noted that when the dies are closed there is a space between the head 60 and the adjacent surface 44a of the housing 44 as shown in Fig. 3. However, when the dies begin to separate and pressure is removed from the rod 53, the head 60 engages the surface 44a of the housing 44 as shown in Fig. 4 and thus the parts of the toggle mechanism are relieved of the spring load.

Thus it will be seen that the spring 35, besides acting as a safety feature to prevent damage to the die members which might be caused by pressing them together with unyielding force, also serves as a follow-up device to close the dies when the resistance to the movement of the movable die ceases.

The operating unit 22 herein described, it will be noted comprises a unitary assembly which is removably connected to the carrier and which with the die member 25 and connected rod 53 may be completely and bodily removed from the carrier by simply removing bolts 45 thus permitting the unit to be slidably removed from the carrier at some point where roller 23 is free of the cam 30; e.g. at the 3 o'clock position of the drum in Fig. 1. As a result repair or replacement of the unit is greatly facilitated.

It will be observed from Fig. 3, that rings 63 and 65 on the part 18 of the drum carry the fixed and relatively movable die members and that these have chambers 66 which are connected by pipes 67 to a swivel connection for steam or other temperature controlling fluid. When molding rubber or other thermoplastic material, steam is used and the rings become hot. To avoid conduction of heat from the major portion 18 of the drum to the part 19 carrying the operating units 22, the actual physical contact between the part 18 and the part 19 is reduced to a minimum. This is accomplished in the apparatus illustrated by having a small portion of a flange 68 on the part 19 fit within the ring 64 on the part 18 to locate it and passing bolts 69 through lugs 70 on the ring 64 into holes in the flange 68, spacing washers 71 being interposed between the ring and the flange to further reduce the area through which heat may be conducted from one to the other. This enables the operating units to be lubricated without the difficulties caused by high temperatures.

To permit the rapid conversion of the machine from the manufacture of one product to that of another of different size or shape, the movable die member 25 includes a removable die head 72 which may be secured in the main body of the die member 25 by means of a locking screw 73 while the fixed die member 26 is itself removably mounted in the ring 65 and is held in its position by a locking screw 74. Thus, either the die head or the immovable die member or both may be removed by merely loosening the set screws holding them in place, slipping them off their supports, and substituting other parts and holding them in place by tightening the set screw.

To solve the problem of molding elastic articles with a clean hole therethrough (such as the screw hole in the center of a bibb washer), the present invention provides a hole-forming rod or projection 75 in one of the die members with a recess 76 in its end, leaving only a very narrow cut-off surface 77 defining the inner wall of the hole to be formed. When the die members are closed and the rod abuts its opposing surface 38a on the other die member, the molding material unavoidably lying between the cut-off surface 77 at the end of the rod and its abutment is squeezed out leaving the hole, when the die members are separated, open clear through with little or no flash clinging to the margin of the hole.

The material lying inside the cut-off surface 77 may either be squeezed out by application of yielding pressure or may be retained within the recess 76 to be disposed of in some way.

As illustrated in Fig. 5, the recess 76 in the rod communicates with a passage 79 extending through the die member to an outlet 80. By this arrangement, molding material trapped within the cut-off surface 77 is forced through the passage 79 accumulating until it projects through the outlet as an extrusion where it is knocked off by a finger 81 (Fig. 1) located in the path of the die members.

Variations and modifications may be made within the scope of the claims and portions of the improvements may be used without others.

I claim:

1. A toggle unit for operating a movable die member of a pair of axially aligned relatively movable die members cooperating to form an article, said die members being movable between open and closed position, said toggle unit comprising a housing mounted on a structure supporting the die members, a pair of connected toggle links mounted in said housing, one of said links being pivotally connected to said movable die member, resilient means in substantial axial alignment with said die members and associated with said other link to yieldingly resist movement of the die member in opening direction when the links are locked during the forming of an article and to resiliently close the die members when resistance to closing movement has dissipated, said resilient means including means to relieve said link members of the load exerted by said resilient means in open die position so that said link members are provided with a desirable amount of play in open die position, and operating means slidably mounted in said housing for reciprocation therein and connected to one of said link members for moving said toggle links so that said die members are closed and said links are locked in die closed position.

2. A toggle unit as in claim 1, having means for adjusting the resiliency of said resilient means.

3. A toggle unit as in claim 1 in which said resilient means includes a bar pivotally connected to the end portion of said other link for slidable reciprocating movement in said housing in axial alignment with said die members and a spring fixed to said housing and operably engaging said bar to yieldingly resist opening movement of the die members which is transmitted through the links and bar member to said spring and to resiliently close the die members when resistance to closing movement has dissipated, said spring being adjustably mounted for varying the yielding resistance thereof.

4. A toggle unit as in claim 1 in which said operating means includes a slide bar slidably mounted in said housing for reciprocation therein, a fork member mounted on said slide bar for movement therewith, said member being operably connected to one of said links and a cam follower fixed to said bar for engaging operating cams whereby said bar is actuated to move said toggle links into self-locking position when the die members are closed.

5. A toggle unit as in claim 1 wherein said toggle links in locked die closed position are out of axial alignment with one another and abutting a portion of said housing to prevent axial displacement of said links by the opening pressure of said die members.

6. A toggle unit for operating a movable die member of a pair of axially aligned relatively movable die members cooperating to form an article, said die members being movable between open and closed position, said toggle unit comprising a housing removably mounted on a structure supporting the die members, a pair of connected toggle links mounted in said housing, one of said links being pivotally connected to said movable die member, a bar pivotally connected to the end portion of said other link for reciprocating movement in said housing in axial alignment with said die members, means fixed to said housing for operably engaging said bar to yieldingly resist axial movement of the same under the opening pressure of said die members and to resiliently close the die members when resistance to closing movement has dissipated, means for adjusting the yielding resistance of said resilient means, means for relieving said toggle link members of the load exerted by said resilient means in open die position so that said links are provided with a desirable amount of play in open die position, a slide bar slidably mounted in said housing for reciprocation therein, said slide bar being substantially parallel the axis of said die members, a fork member connected to said slide bar for movement therewith, said fork member being operably connected to one of said toggle links and a cam follower fixed to said slide bar for engaging operating cams whereby said slide bar is reciprocated to move said toggle links by means of said fork member into self-locking position, said toggle links being moved past center position into abutting relation with a portion of said housing.

7. An apparatus for molding articles of plastic material comprising a rotatable drum; a plurality of pairs of axially aligned die members relatively movable between opened and closed positions mounted on the drum in closely spaced relation and movable by said drum successively past charging and discharging stations; means for guiding a continuous strip of plastic molding material between the die members in opened position at the charging station; and means for closing the die members on the said strip at the charging station to blank a portion of the material of the strip therefrom and for opening the die members at the discharging station for discharging the molded articles from the die members, one of each pair of die members being relatively stationary and the other being movable and each movable die member being actuated by an operating unit mounted on the rotatable drum and including a toggle mechanism which is self-locking in die-closing position.

8. The apparatus as defined in claim 7 in which the toggle mechanism includes a follower, and there are fixed cam surfaces which, as the drum rotates, are engaged by the follower intermittently to operate the toggle to open and close the die members.

9. The apparatus as defined in claim 8 in which the cam surfaces are shaped for repeatedly and momentarily opening and closing the die members on the fresh blank therein.

10. The apparatus as defined in claim 7 in which the toggle mechanism is spring-backed to yieldingly resist opening movement of the die members under the force of expansion of the blank therein when heated and to resiliently close the die members when the opening force has been dissipated.

11. The apparatus as defined in claim 7 in which the toggle is mounted for bodily movement away from die-closing position in self-locking condition, and a spring is provided to resiliently resist forceful bodily movement and return the toggle to die-closing position when said force is dissipated or removed.

12. The apparatus as defined in claim 8 in which cam surfaces are on cam plates and there is a fixed stationary support following the contour of the drum and spaced therefrom, and means for adjustably securing the cam plates to said support.

13. Apparatus for molding articles of plastic material comprising a rotatable drum; a plurality of pairs of axially aligned die members relatively movable between opened and closed positions mounted on the drum in closely spaced relation and movable by said drum successively past charging and discharging stations; means for guiding a continuous strip of plastic molding material between the die members in opened position at the charging station; and means for closing the die members on the said strip at the charging station to blank a portion of the material of the strip therefrom and for opening the die members at the discharging station for discharging the molded articles from the die members, each means for opening and closing the die members being mounted on a separate subframe removable from the drum for replacement and repairs.

14. An apparatus for molding articles of plastic material comprising a rotatable drum mounted within a relatively stationary cam track, a plurality of pairs of axially aligned cavity forming die members relatively movable between open and closed positions mounted on the drum in closely spaced circular relationship and movable by said drum successively past charging and discharging stations; means for guiding a continuous strip of plastic molding material between the die members in open position at the charging station; an individual toggling unit for actuating each pair of relatively movable die members mounted on said drum and movable therewith, said unit including a pair of pivotally connected link members mounted in said unit, the end portion of one of said links being operatively connected to one of said die members; operating means connected to one of said links for moving the links into locked position when the die members are to be closed, said operating means having a cam follower for engaging the cam track as the said drum revolves to successively operate the toggling unit to close the die members onto said strips to blank a portion of the material of the strip therefrom and deposit the blank in the cavity between the die members and mold the article, and to open the die members at the discharge station of the drum for discharging the molded article from the die members, and a yielding means fixed to said unit and connected to the end portion of the other said link member to yieldingly resist the movement of the die members in opening direction when the links are locked during the blaking and forming of an article between the die members and to resiliently close the die members when the resistance to closing movement has dissipated.

References Cited in the file of this patent

UNITED STATES PATENTS

| | | |
|---|---|---|
| 977,687 | Todt | Dec. 6, 1910 |
| 1,368,836 | Priester | Feb. 15, 1921 |
| 1,525,629 | Thompson | Feb. 10, 1925 |
| 1,633,317 | Derry | June 21, 1927 |
| 1,711,978 | Wanders | May 7, 1929 |
| 1,965,732 | Blisterfield | July 10, 1934 |
| 2,027,915 | Kux | Jan. 14, 1936 |
| 2,055,742 | Burk | Sept. 29, 1936 |
| 2,058,880 | Hunt | Oct. 27, 1936 |
| 2,132,788 | Hunt | Oct. 11, 1938 |
| 2,624,915 | Corson | Jan. 13, 1953 |
| 2,657,426 | Gora | Nov. 3, 1953 |
| 2,711,567 | Knapp | June 28, 1955 |

UNITED STATES PATENT OFFICE
CERTIFICATE OF CORRECTION

Patent No. 2,915,784                                    December 8, 1959

Henry Z. Gora

It is hereby certified that error appears in the printed specification of the above numbered patent requiring correction and that the said Letters Patent should read as corrected below.

Column 5, line 39, for "shows" read -- throws --; column 8, line 20, for "An apparatus" read -- Apparatus --; column 10, line 7, for "blaking" read -- blanking --.

Signed and sealed this 31st day of May 1960.

(SEAL)
Attest:

KARL H. AXLINE                                    ROBERT C. WATSON
Attesting Officer                                  Commissioner of Patents